(12) United States Patent
Bianchini

(10) Patent No.: US 7,670,062 B1
(45) Date of Patent: Mar. 2, 2010

(54) UNIVERSAL OPTICAL SUBASSEMBLY HOLDER

(75) Inventor: Gioni Bianchini, Sunol, CA (US)

(73) Assignee: Fourte Design & Development LLC, Sunol, CA (US)

( * ) Notice: Subject to any disclaimer, the term of this patent is extended or adjusted under 35 U.S.C. 154(b) by 0 days.

(21) Appl. No.: 12/384,009

(22) Filed: Mar. 30, 2009

Related U.S. Application Data

(63) Continuation of application No. 11/732,731, filed on Apr. 4, 2007, now abandoned.

(51) Int. Cl.
*G02B 6/36* (2006.01)
(52) U.S. Cl. .......................... 385/88; 385/92
(58) Field of Classification Search ................ 385/88, 385/92
See application file for complete search history.

(56) References Cited

U.S. PATENT DOCUMENTS

| | | | |
|---|---|---|---|
| 7,008,119 B2 * | 3/2006 | Mizue et al. ................. | 385/88 |
| 7,270,489 B2 * | 9/2007 | Yu et al. ....................... | 385/89 |
| 7,419,313 B2 * | 9/2008 | Jablonski et al. ............. | 385/92 |
| 7,476,039 B2 * | 1/2009 | Moore .......................... | 385/92 |

* cited by examiner

*Primary Examiner*—Uyen-Chau N Le
*Assistant Examiner*—John M Bedtelyon
(74) *Attorney, Agent, or Firm*—Carr & Ferrell LLP

(57) ABSTRACT

A universal holder for optical subassembly devices includes a clamping element affixed to a main body. The main body of the holder includes four locating surfaces to accurately position the optical subassemblies in the transceiver module. The main body further includes a central opening that receives a front ferrule of the optical subassembly. The central opening locates the optical subassembly in the x-y plane so that the optical subassembly is concentric with the holder. The locating surfaces accurately seat the optical subassembly in the transceiver module. The clamping element comprises a plurality of clamping arms that contact the back side of a flange on the front ferrule of the optical subassembly. When the holder is assembled to the optical subassembly, hooked ends of the arms secure the holder to the flange.

12 Claims, 3 Drawing Sheets

UNIVERSAL OPTICAL SUBASSEMBLY HOLDER

This application is a continuation of Applicant's U.S. application Ser. No. 11/732,731, filed Apr. 4, 2007, now abandoned.

BACKGROUND OF THE INVENTION

1. Field of the Invention

The present invention relates generally to optical subassemblies, and more particularly is a universal holder for tosa/rosa applications.

2. Description of the Prior Art

Computers and related peripheral equipment, as well as satellite and communication systems, have in the recent past evolved extremely rapidly. These systems require ever increasing data transfer rates to perform the highly complex tasks that drive the systems, such as digital signal processing, image analysis, and communications. With current demands, optical couplers are used to transfer signals over short and long distances between computers, between two circuit boards in one computer, and even between multiple chips on a single printed circuit board. The use of high speed optical signals in place of electrical interconnections increases the achievable data transfer rate.

Optical link modules include an optical transmitting sub-assembly (tosa) that converts an electrical signal to an optical signal, and an optical receiving sub-assembly (rosa) that converts an optical signal to an electrical signal. The tosa and rosa are enclosed within a housing and are then plugged into the desired application. Accurate positioning of the tosa and rosa subassemblies is therefore required. The location of each of the optical subassemblies relative to the Ic connector port must remain fixed within a tolerance of 0.05 mm.

Module manufacturers use many different arrangements for the optical subassembly (osa) holders that position the subassemblies within the modules (e.g v-groove, through hole, etc.). However, regardless of the manufacturers choice of specific connector types and dimensions, two factors remain constant for all tosa/rosa subassemblies: the front ferrule diameter is (2.98-3.00 mm), and the flange thickness is (0.52-0.63 mm).

Accordingly, it is an object of the present invention to provide a universal holder that provides positioning means that are fixed on the front ferrule and that attach the holder to the flange of the optical subassembly.

It is another object of the present invention to provide a holder that is snapped onto the optical subassembly outside the module. The holder positioning means then allow the user to accurately locate the optical subassembly in the proper position in the module.

SUMMARY OF THE INVENTION

The present invention is a universal holder for optical subassembly devices. The holder comprises a clamping element typically formed from sheet metal that is affixed to a main body formed from plastic. The main body of the holder comprises four locating surfaces to accurately position the optical subassemblies in the transceiver module.

The main body further comprises a central opening that receives a front ferrule of the optical subassembly. The central opening locates the optical subassembly in the x-y plane so that the optical subassembly is concentric with the holder. The locating surfaces accurately seat the optical subassembly in the transceiver module.

The clamping element comprises a plurality of clamping arms that contact the back side of a flange on the front ferrule of the optical subassembly. When the holder is assembled to the optical subassembly, hooked ends of the arms secure the holder to the flange.

The optical subassembly is prepared for insertion into the transceiver module by inserting the front ferrule of the optical subassembly into and through the central opening of the holder main body. The hooked ends of the clamping arms expand as they are pushed over the flange on the optical subassembly, and then retract when the holder is in position on the subassembly. With the hooked ends retracted, the clamping arms affix the holder to the optical subassembly. The optical subassembly is then ready to be positioned in the transceiver module with the aid of the locating surfaces on the main body of the holder.

An advantage of the present invention is that the universal holder can be used for all types of optical subassembly constructions.

Another advantage of the present invention is that the holder enables the optical subassembly to be accurately and easily positioned within the transceiver module.

A still further advantage of the present invention is that the universal holder is simple in construction, and therefore easy to manufacture.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
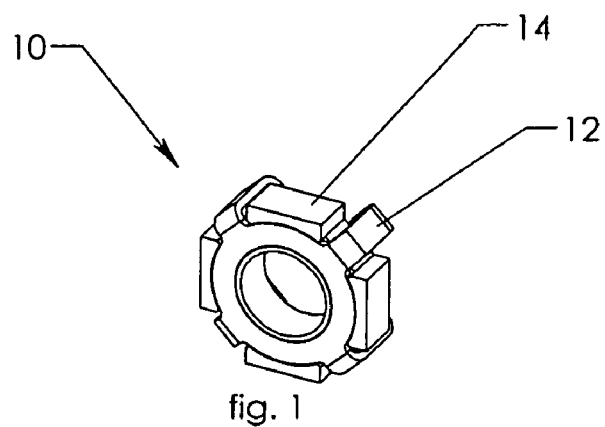
FIG. 1 is a front perceptive view of the universal optical subassembly holder of the present invention.
Figure 2:
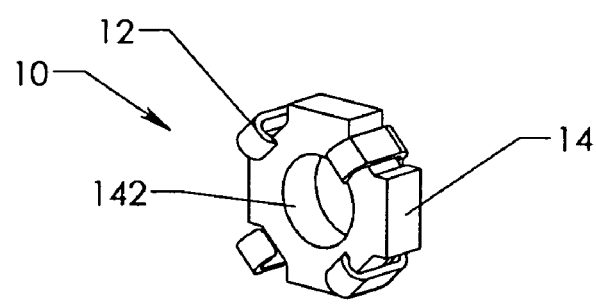
FIG. 2 is a rear perspective view of the optical subassembly holder.
Figure 3:
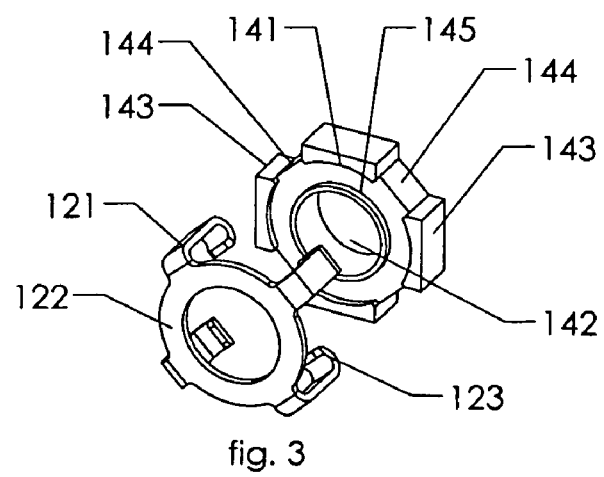
FIG. 3 is an exploded view of the optical subassembly holder.
Figure 4:
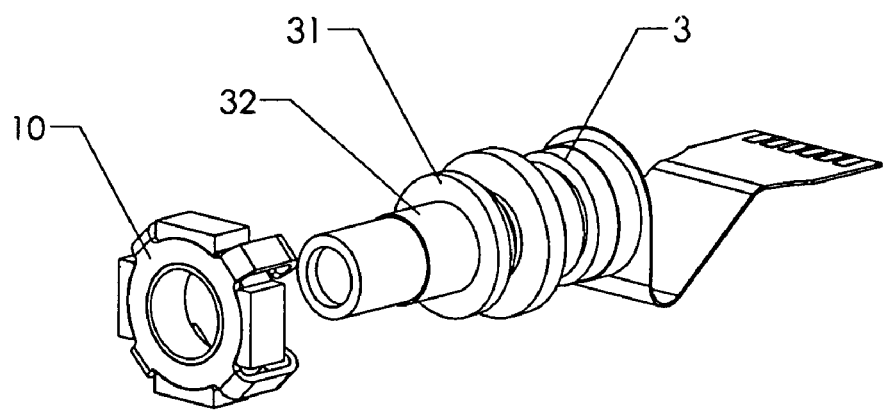
FIG. 4 is a perspective view of the optical subassembly holder in position to be installed on an optical subassembly.
Figure 5:
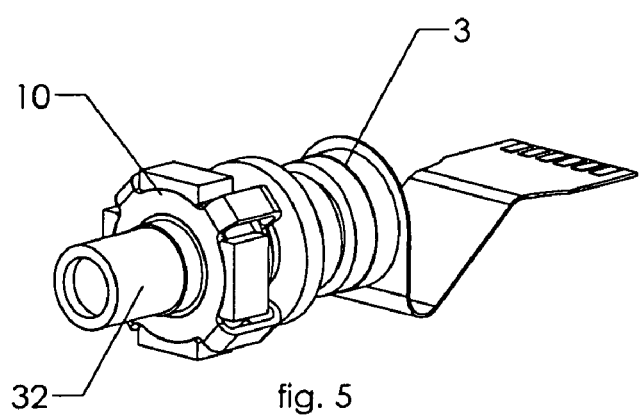
FIG. 5 is a front perspective view of the optical subassembly holder installed on an optical subassembly.
Figure 6:
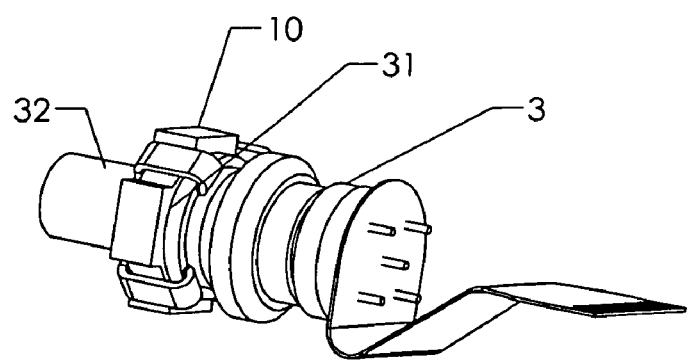
FIG. 6 is a rear perspective view of the optical subassembly holder installed on an optical subassembly.
Figure 7:
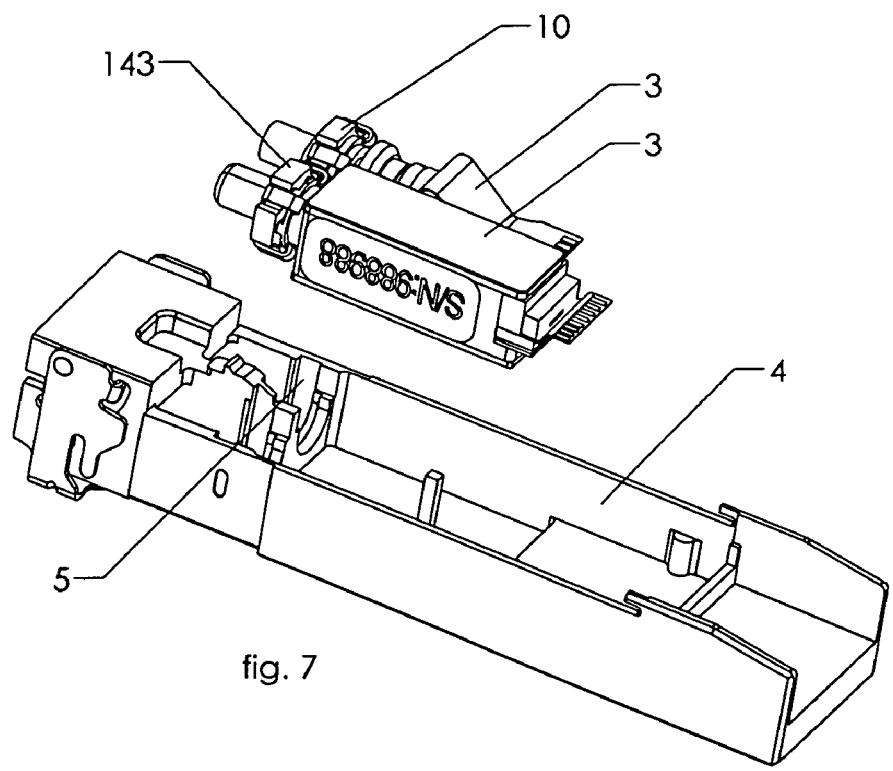
FIG. 7 shows two holders installed on a tosa/rosa pair ready to be installed in an optical transceiver module.
Figure 8:
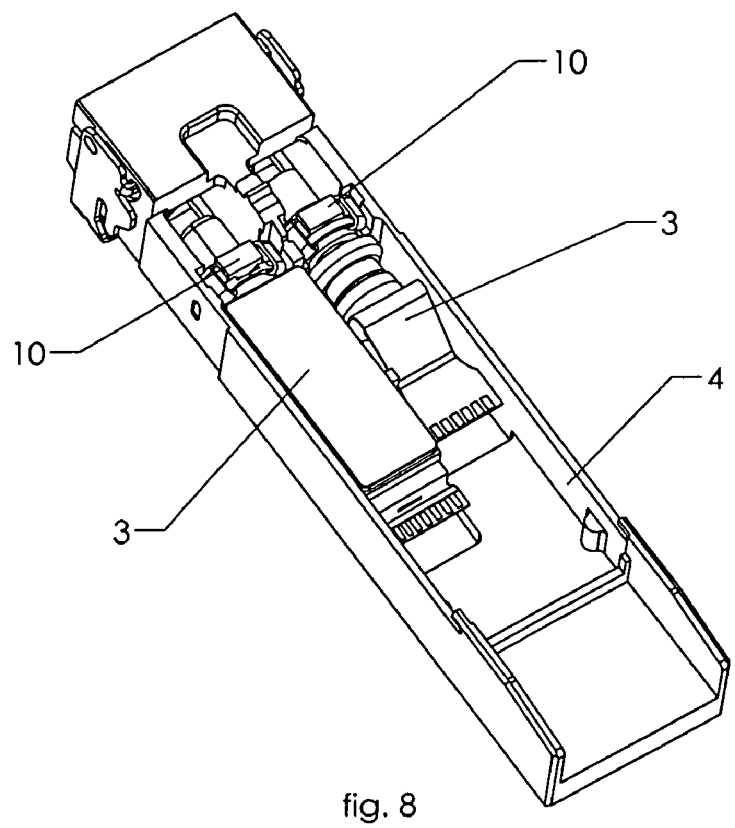
FIG. 8 shows the tosa/rosa pair installed in the module.

The present invention is a universal holder 10 for optical subassembly devices 3. The holder 10 comprises a clamping element 12 that is affixed to a main body 14. In the preferred embodiment, the clamping element 12 is formed from sheet metal, and the main body 14 is formed from plastic.

The clamping element 12 comprises a plurality of clamping arms 121 that extend rearward from a central annular body 122. The clamping arms 121 terminate in fastening means 123. The fastening means 123 contact the back side of a flange 31 on the front ferrule 32 of the optical subassembly 3. In the preferred embodiment, the fastening means are hooked distal ends 123 of the clamping arms 121. The hooked ends 123 are bent at a 90° angle relative to the main portion of the clamping arms 121. When the holder 10 is assembled to the optical subassembly 3, the fastening means 123 of the clamping arms 121 secure the universal holder 10 to the flange 31.

The clamping element 12 works in conjunction with the main body 14 of the universal holder 10. The main body 14 of the holder 10 comprises an annular central element 141 with a central through hole 142. The central through hole 142 receives the front ferrule 32 of the optical subassembly 3 to locate the optical subassembly 3 in the x-y plane so that the optical subassembly 3 is concentric with the holder 10. The main body 14 of the holder 10 further comprises a plurality of locating surfaces 143 to accurately position the optical subassembly 3 in the transceiver module 4. In the preferred embodiment, there are four locating surfaces 143 situated at 90° intervals around the main body 14. Between each pair of locating surfaces 143 is a clamping arm opening 144 that receives a clamping arm 121 of the clamping element 12. The main body 14 also comprises a circular clamping element seat 145 that receives the annular body 122 of the clamping element 12.

The universal optical subassembly holder 10 of the present invention is assembled and used as follows: At the production level, the clamping element 12 is mounted on the main body 14 by pushing the clamping element 12 onto the main body 14. The annular body 122 is received in the clamping element seat 145 of the main body 14. The fastening means 123 contact the central element 141 of the main body 14, and the clamping arms 121 flex to allow the fastening means to slide over the clamping arm openings 144.

The end user assembles the universal holder 10 with the optical subassembly 3 by inserting the front ferrule 32 of the optical subassembly 3 through the central through holes 142 of the holder 10, with the clamping arms 121 facing rearward. The fastening means, hooked ends 123, contact the flange 31 of the optical subassembly 3. This causes the arms 121 to flex as the optical subassembly 3 is pressed into the universal holder 10.

As the optical subassembly 3 continues to be moved into the holder 10, the hooked ends 123 of the clamping element 12 pass over the flange 31. When the hooked ends 123 clear the flange 31, the arms 121 return the hooked ends 123 to their original position. The hooked ends 123 remain in contact with a back side of the flange 31, and the optical subassembly 3 is secured within the universal holder 10.

Typically, a tosa/rosa pair of optical subassemblies 3 are then installed in the transceiver module 4. The locating surfaces 143 on the main body 14 of the holder 10 are received in the locating grooves 5 in the transceiver module 4. The fit of the locating surfaces 143 into the locating grooves 5 in the transceiver module 4 ensures that the optical subassemblies 3 are properly located in the transceiver module 4, and the secure placement of the front ferrules 32 in the through hole 142 in the main body 14 of the holder 10 ensures that the optical subassemblies 3 are properly located in the x-y plane of the transceiver module 4.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A holder adapted to secure an optical subassembly in a transceiver module comprising:
   a clamping element with at least one clamping arm extending therefrom, and
   a main body with at least one clamping arm opening; wherein
   a front ferrule of the optical subassembly is received in said main body, said main body thereby locating the optical subassembly in an x-y plane,
   said clamping arm flexes outward as the front ferrule of the optical subassembly is inserted into a through hole of said main body so that said clamping element surrounds said ferrule of the optical subassembly, said clamping arm then retracts when the optical subassembly is fully inserted so as to contact a trailing side of a flange of the optical subassembly, so that said clamping arm is received in said clamping arm opening and fixes the optical subassembly in place in said holder, and secures the optical subassembly in a proper position in the transceiver module.

2. The holder of claim 1 wherein:
   a hooked end of said clamping arm forms a fastening means that contacts said trailing side of said flange.

3. The holder of claim 1 wherein:
   said main body further comprises a clamping arm opening corresponding to each said clamping arm of said clamping element.

4. The holder of claim 1 wherein:
   said main body comprises a clamping element seat that receives an annular body of said clamping element.

5. A holder adapted to secure an optical subassembly in a transceiver module comprising:
   a clamping element with at least one clamping arm extending therefrom,
   a main body with at least one clamping arm opening and a central through hole; wherein
   a front ferrule of the optical subassembly is inserted into said central through hole of said main body so that said clamping element surrounds said ferrule of the optical subassembly, said through hole thereby locating the optical subassembly in an x-y plane,
   said clamping arm flexes outward as the front ferrule of the optical subassembly is inserted into said through hole, said clamping arm then retracts when the optical subassembly is fully inserted so as to contact a trailing side of a flange of the optical subassembly, so that said clamping arm is received in said clamping arm opening and fixes the optical subassembly in place in said holder, and secures the optical subassembly in a proper position in the transceiver module.

6. The holder of claim 5 wherein:
   a hooked end of said clamping arm forms a fastening means that contacts said trailing side of said flange.

7. The holder of claim 5 wherein:
   said main body further comprises a clamping arm opening corresponding to each said clamping arm of said clamping element.

8. The holder of claim 5 wherein:
   said main body comprises a clamping element seat that receives an annular body of said clamping element.

9. A holder adapted to secure an optical subassembly in a transceiver module comprising:
   a clamping element with at least one clamping arm extending therefrom,
   a main body with at least one clamping arm opening and a central through hole; wherein
   a front ferrule of the optical subassembly is inserted into said central through hole of said main body so that said clamping element surrounds said ferrule of the optical subassembly, said through hole thereby locating the optical subassembly in an x-y plane, said clamping arm flexes outward as the front ferrule of the optical subassembly is inserted into said through hole, said clamping arm then retracts when the optical subassembly is fully inserted so that fastening means on a distal end of said clamping arm contact a trailing side of a flange of the optical subassembly and said clamping arm is received in said clamping arm opening, thereby fixing the optical subassembly in place in said holder, and secures the optical subassembly in a proper position in the transceiver module.

10. The holder of claim 9 wherein:
said fastening means is a hooked end of said clamping arm.

11. The holder of claim 9 wherein:
said main body further comprises a clamping arm opening corresponding to each said clamping arm of said clamping element.

12. The holder of claim 9 wherein:
said main body comprises a clamping element seat that receives an annular body of said clamping element.

\* \* \* \* \*